US009692243B2

United States Patent
Kaji et al.

(10) Patent No.: US 9,692,243 B2
(45) Date of Patent: Jun. 27, 2017

(54) FREQUENCY REGULATION METHOD, FREQUENCY REGULATION APPARATUS, AND STORAGE BATTERY SYSTEM

(71) Applicant: Panasonic Intellectual Property Management Co., Ltd., Osaka (JP)

(72) Inventors: Mitsuru Kaji, Osaka (JP); Kenichi Watanabe, Osaka (JP); Hoday Stearns, Santa Clara, CA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 14/440,925

(22) PCT Filed: Nov. 19, 2013

(86) PCT No.: PCT/JP2013/006783
§ 371 (c)(1),
(2) Date: May 6, 2015

(87) PCT Pub. No.: WO2015/075758
PCT Pub. Date: May 28, 2015

(65) Prior Publication Data
US 2016/0013676 A1    Jan. 14, 2016

(51) Int. Cl.
*H02J 7/00* (2006.01)
*H02J 3/32* (2006.01)
*H02J 13/00* (2006.01)

(52) U.S. Cl.
CPC ......... *H02J 7/0068* (2013.01); *H02J 3/32* (2013.01); *H02J 13/0006* (2013.01); *Y02E 60/722* (2013.01); *Y04S 10/14* (2013.01)

(58) Field of Classification Search
CPC .................................................. H02J 7/0068
(Continued)

(56) References Cited

U.S. PATENT DOCUMENTS 6,160,382 A * 12/2000 Yoon et al. ........ G01R 31/3651
                                                    320/134
8,493,030 B2 * 7/2013 Paice et al. ............... H02J 3/32
                                                    320/132
(Continued)

FOREIGN PATENT DOCUMENTS

JP    2008-178215    7/2008
JP    2008-543256    11/2008
(Continued)

OTHER PUBLICATIONS

International Search Report issued Dec. 17, 2013 in corresponding International Application No. PCT/JP2013/006783.
(Continued)

*Primary Examiner* — Sun Lin
(74) *Attorney, Agent, or Firm* — Wenderoth, Lind & Ponack, L.L.P.

(57) ABSTRACT

Provided is a frequency regulation method for regulating a frequency of a power system so that the frequency approximates to a rated frequency, the method including: measuring the frequency; obtaining an SOC (state of charge) of a storage battery; determining a base-point of power to be charged in or discharged from the storage battery when the measured frequency is equal to a predetermined rated frequency; determining a control variable changed from the base-point by an amount corresponding to a frequency deviation that is a difference between the predetermined rated frequency and the measured frequency; and charging or discharging the storage battery based on the control variable, wherein in the determining a base-point, a third rate of change is smaller than a first rate of change and a second rate of change that are average rates of change in the base-point with respect to the SOC when the SOC is within a first range and a second range, respectively.

11 Claims, 13 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 8,575,886 | B2* | 11/2013 | Oohara et al. ............ | H02J 3/32 |
| | | | | 290/44 |
| 8,986,502 | B2* | 3/2015 | Holter et al. .......... | D21H 17/69 |
| | | | | 106/474 |
| 2010/0072817 | A1 | 3/2010 | Hirst | |

FOREIGN PATENT DOCUMENTS

| | | |
|---|---|---|
| JP | 2012-16077 | 1/2012 |
| JP | 2012-143018 | 7/2012 |
| JP | 2013-179785 | 9/2013 |
| WO | 2006/128709 | 12/2006 |

OTHER PUBLICATIONS

Reply to Written Opinion issued Dec. 17, 2013 in corresponding International Application No. PCT/JP2013/006783 (with English translation).

* cited by examiner

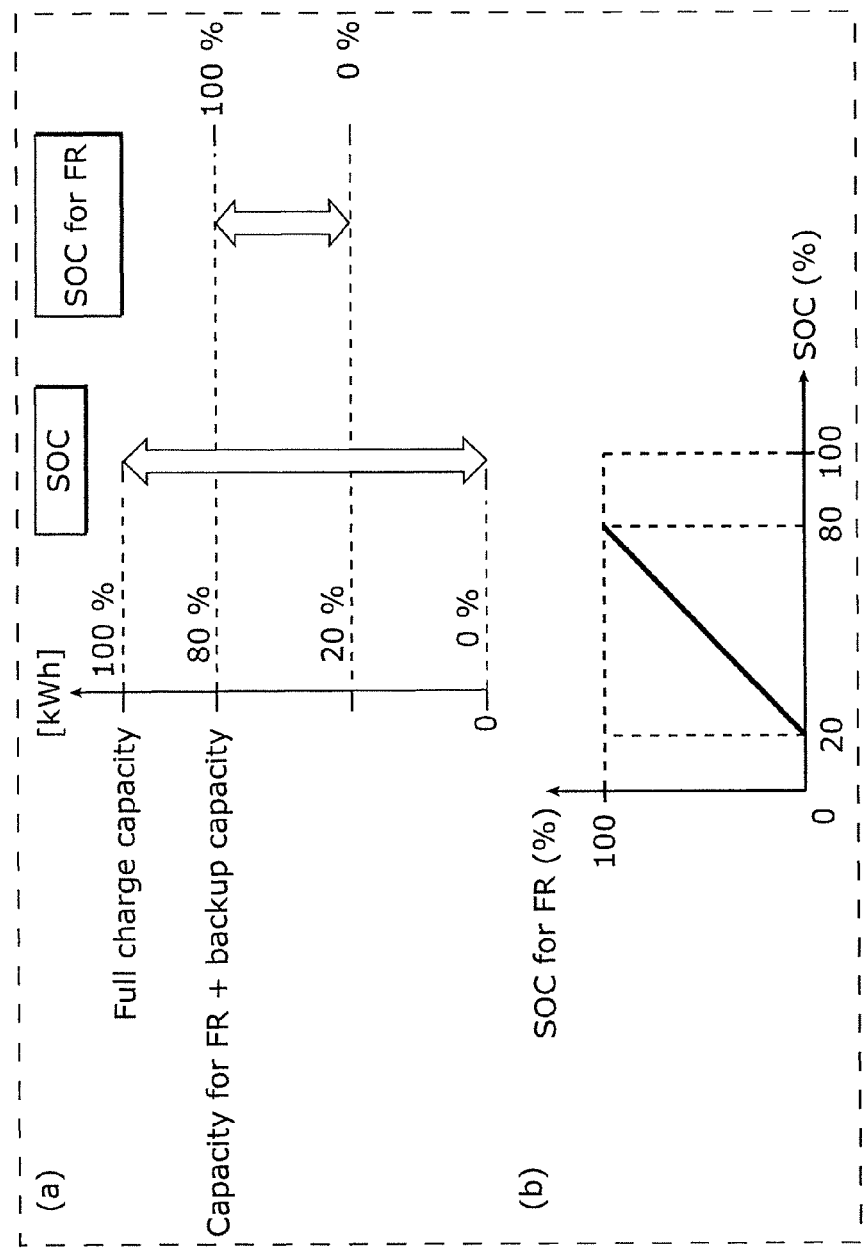

FREQUENCY REGULATION METHOD, FREQUENCY REGULATION APPARATUS, AND STORAGE BATTERY SYSTEM

TECHNICAL FIELD

The present invention relates to a frequency regulation method for regulating a frequency of a power system so that the frequency approximates to a rated frequency, and to a frequency regulation apparatus and a storage battery system that perform such a method.

BACKGROUND ART

The techniques of charge and discharge control for charging power in storage batteries connected to power systems and discharging power from the storage batteries so that each of the power systems maintains a rated frequency have been conventionally disclosed (see Patent Literature (PTL) 1). PTL 1 discloses the technique of charge and discharge control over a storage battery so that a frequency of a power system is maintained within a predetermined range and a state of charge (hereinafter abbreviated as "SOC") of the storage battery is also maintained within a predetermined range.

CITATION LIST

Patent Literature

[PTL 1] Japanese Unexamined Patent Application Publication No. 2012-16077

SUMMARY OF INVENTION

Technical Problem

When the frequency of the power system deviates from the predetermined range for a long period of time, there occurs a problem in discontinuation of frequency regulation.

Here, the present invention provides a frequency regulation method that can regulate a frequency of a power system over a longer period of time.

Solution to Problem

The frequency regulation method according to an aspect of the present invention is a frequency regulation method for regulating a frequency of a power system so that the frequency approximates to a rated frequency, the method including: measuring the frequency; obtaining an SOC of a storage battery; determining a base-point indicating a reference value of power to be charged in or discharged from the storage battery; determining a charge or discharge control variable that is a value changed from the base-point by an amount corresponding to a frequency deviation that is a difference between the rated frequency and the measured frequency; and charging or discharging the storage battery based on the charge or discharge control variable, wherein in the determining of a base-point: the base-point is determined in such a manner that as the obtained SOC increases, the power to be discharged from the storage battery increases or the power to be charged in the storage battery decreases; and a third rate of change is smaller than a first rate of change and a second rate of change, the first rate of change being an average rate of change in the base-point with respect to the SOC when the SOC is within a first range smaller than a first threshold, the second rate of change being an average rate of change in the base-point with respect to the SOC when the SOC is within a second range larger than a second threshold larger than the first threshold, the third rate of change being an average rate of change in the base-point with respect to the SOC when the SOC is within a third range from the first threshold to the second threshold.

These general and specific aspects may be implemented using a system, a method, an integrated circuit, a computer program, or a computer-readable recording medium such as a CD-ROM, or any combination of the system, the method, the integrated circuit, the computer program, and the recording medium.

Advantageous Effects of Invention

The frequency regulation method according to the present invention enables the frequency regulation on a power system over a longer period of time.

BRIEF DESCRIPTION OF DRAWINGS

FIG. 3A indicates an SOC of a storage battery according to Embodiment 1.

Figure 1:
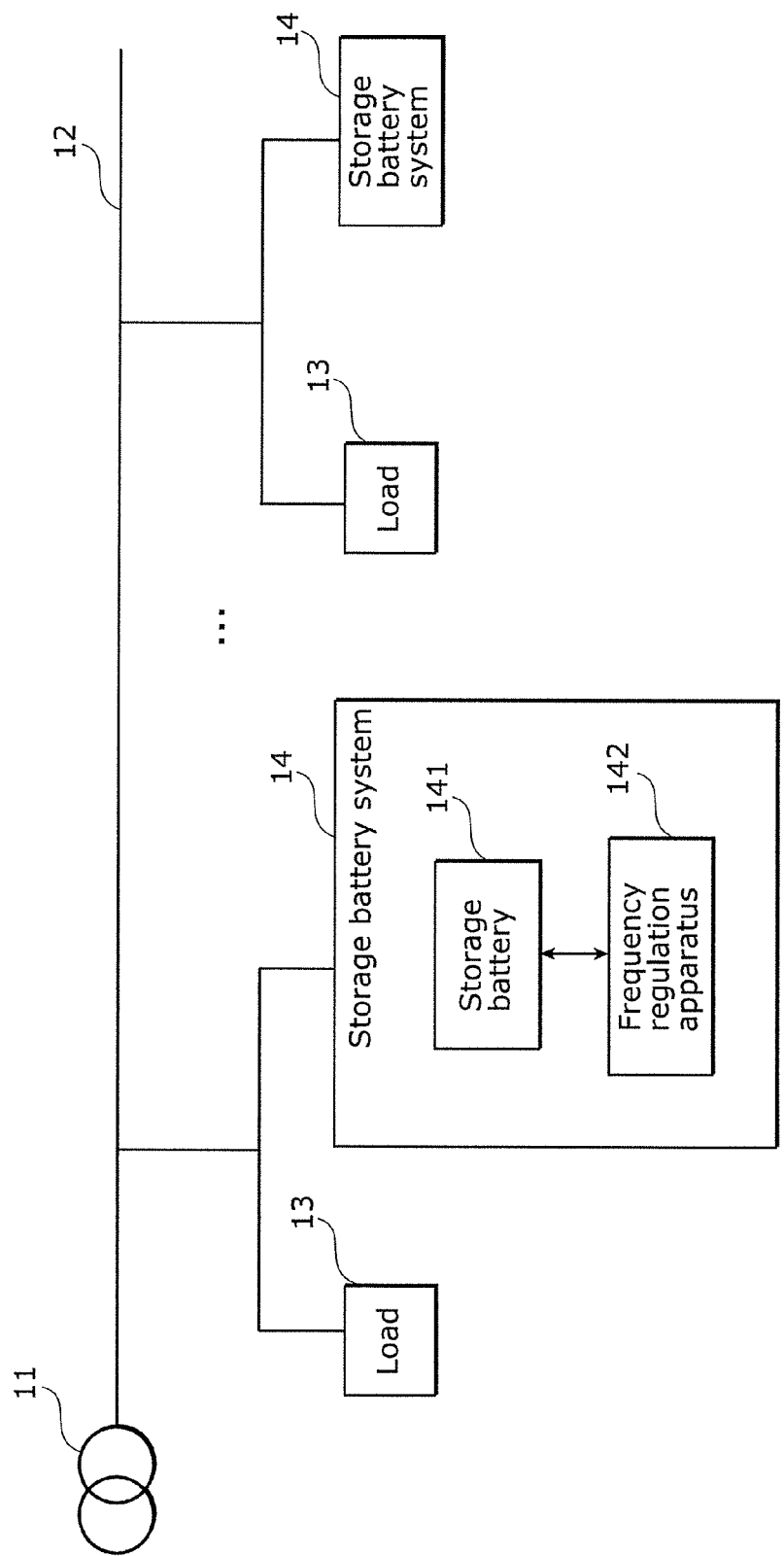
FIG. 1 illustrates a configuration of a power network including a frequency regulation apparatus according to Embodiment 1.

DESCRIPTION OF EMBODIMENTS (Underlying Knowledge Forming Basis of the Present Invention)

The inventors have found that the frequency regulation method described in the "Background Art" has the following problems.

The "Background Art" describes the frequency regulation (may simply be referred to as "FR") that is regulation for maintaining a frequency of a power system at a rated frequency.

According to the technique, a frequency regulation apparatus performs the charge and discharge control by causing a storage battery to charge or discharge the storage battery so that a power system maintains a rated frequency. General electric power companies that operate power systems appropriately perform the charge and discharge control by monitoring frequencies of the power systems and the SOC of the storage battery and charging or discharging the storage battery. Furthermore, when the amounts of charge and discharge are averaged over a relatively long period of time (for example, several hours), the amounts are controlled to be balanced. In principle, the frequency regulation can be continuously performed without any time limitation under such a control.

In other words, the amounts of charge and discharge become imbalanced and the SOC of the storage battery gradually decreases due to the conversion loss in AC/DC conversion in charging the storage battery or in the DC/AC conversion in discharging the storage battery, or to the power loss in other distribution lines and electric circuits. Thus, the frequency regulation method cannot be continuously performed, and the amount of charge or discharge needs to be corrected in a certain method.

According to the technique disclosed by PTL 1, the frequency regulation is stopped when a power system stays within a predetermined range, and the storage battery is charged or discharged so that the SOC of the storage battery approximates to 50%. Accordingly, the amount of charge or discharge is corrected, and the period of time during which the frequency regulation method is continued can be prolonged.

When the frequency of the power system deviates from the predetermined range for a long time even with application of the technique disclosed by PTL 1, the problem that the frequency regulation cannot be continued still remains.

Here, the present invention provides a frequency regulation method that can regulate a frequency of a power system over a longer period of time.

In order to solve such a problem, the frequency regulation method according to an aspect of the present invention is a frequency regulation method for regulating a frequency of a power system so that the frequency approximates to a rated frequency, the method including: measuring the frequency; obtaining an SOC of a storage battery; determining a base-point indicating a reference value of power to be charged in or discharged from the storage battery; determining a charge or discharge control variable that is a value changed from the base-point by an amount corresponding to a frequency deviation that is a difference between the rated frequency and the measured frequency; and charging or discharging the storage battery based on the charge or discharge control variable, wherein in the determining of a base-point: the base-point is determined in such a manner that as the obtained SOC increases, the power to be discharged from the storage battery increases or the power to be charged in the storage battery decreases; and a third rate of change is smaller than a first rate of change and a second rate of change, the first rate of change being an average rate of change in the base-point with respect to the SOC when the SOC is within a first range smaller than a first threshold, the second rate of change being an average rate of change in the base-point with respect to the SOC when the SOC is within a second range larger than a second threshold larger than the first threshold, the third rate of change being an average rate of change in the base-point with respect to the SOC when the SOC is within a third range from the first threshold to the second threshold.

Accordingly, when the SOC is within the third range, the variation range of the base-point with respect to the change in the SOC can be suppressed smaller than that in the first range or the second range. Thus, the frequency regulation apparatus can regulate the frequency of the power system over a longer period of time.

In the conventional related art, the variation range of the base-point with respect to the change in the SOC is uniform in the first, second, and third ranges. Even when the SOC is closer to a predetermined value (in the third range), the base-point varies according to the change in the SOC. The amount to be charged in or discharged from the power system for regulating the frequency is corrected to appropriately maintain the SOC of the storage battery. The correction sometimes causes switching between the charging in and discharging from the power system. In such a case, the frequency is not appropriately regulated.

With the frequency regulation method according to an aspect of the present invention, the variation range when the SOC is within the third range becomes smaller, and the switching between the charge and discharge is suppressed. As a result, the frequency regulation apparatus can regulate the frequency of the power system using the storage battery while appropriately maintaining the SOC of the storage battery.

For example, the base-point may be a value indicating the power to be charged in or discharged from the storage battery when the measured frequency is equal to the rated frequency.

Accordingly, when the frequency of the power system is equal to the rated frequency, the frequency regulation apparatus can determine, to be an amount of charge or discharge of the storage battery, a value that is changed by the amount corresponding to the frequency deviation from a reference that is a value indicating power to be charged in or discharged from the storage battery.

For example, in the determining of a base-point, the base-point may be determined to be 0 when the obtained SOC is within the third range.

Accordingly, resetting the base-point when the SOC is within the third range to 0 that is a fixed value can further suppress switching between the charging and the discharging.

For example, the first threshold may range from 0 to 50% of a full capacity of the storage battery, and the second threshold may range from 50% to 100% of the full capacity of the storage battery.

Accordingly, when a range of the SOC including 50% is defined as the third range, the frequency can be regulated so that the SOC of the storage battery can be maintained within the third range.

For example, the rated frequency may be a moving average of a plurality of frequencies measured in a previous predetermined period.

Accordingly, the frequency regulation apparatus can suppress the fluctuations in frequency for a relatively short period of time.

For example, the rated frequency may be a standard frequency of the power system.

Accordingly, the frequency regulation apparatus can reduce a difference between the frequency of a power system and the standard frequency.

For example, the frequency regulation method may further include determining an operating range indicating a maximum range within which an amount of charge or discharge is increased with respect to the base-point, wherein in the determining of a charge or discharge control variable, the charge or discharge control variable may be determined to be closer to a maximum charge value as an absolute value of the frequency deviation increases, when the frequency deviation is larger than 0, the maximum charge value being a value obtained by adding the operating range to the base-point, and the charge or discharge control variable may be determined to be closer to a maximum discharge value as the absolute value of the frequency deviation increases, when the frequency deviation is smaller than 0, the maximum discharge value being a value obtained by subtracting the operating range from the base-point.

Accordingly, the frequency regulation apparatus can determine an amount of charge or discharge of the storage battery according to the frequency deviation within the operating range.

For example, in the determining of a base-point, a base-point may be newly determined each time the charge or discharge control variable is generated.

Accordingly, the frequency regulation apparatus can determine a base-point and a charge or discharge control variable each time the frequency of the power system is obtained, and continuously regulate the frequency.

For example, in the obtaining of an SOC, SOCs may be obtained at predetermined times, and in the determining of a base-point, a base-point may be newly determined when the SOC obtained in the obtaining of an SOC is different from each of the SOCs obtained at the predetermined times by a predetermined value or more.

Accordingly, the frequency regulation apparatus can newly determine a base-point only when the SOC of the storage battery varies to a relatively larger extent. When the change in the SOC of the storage battery is smaller, the frequency regulation apparatus does not newly determine a base-point. Thus, the processing load of the frequency regulation apparatus is reduced.

For example, in the obtaining of an SOC, a percentage of the SOC within a range out of a total capacity of the storage battery may be obtained as the SOC.

Accordingly, the frequency regulation apparatus can charge or discharge a storage battery by avoiding the use in the range of the SOC that accelerates the degradation in the storage battery. Thus, the degradation can be suppressed.

Furthermore, the frequency regulation apparatus according to an aspect of the present invention is a frequency regulation apparatus that regulates a frequency of a power system so that the frequency approximates to a rated frequency, the apparatus including: a frequency measuring unit configured to measure the frequency; a charge obtainment unit configured to obtain an SOC of a storage battery; a base-point determining unit configured to determine a base-point indicating a reference value of power to be charged in or discharged from the storage battery; a control variable determining unit configured to determine a charge or discharge control variable that is a value changed from the base-point by an amount corresponding to a frequency deviation that is a difference between the rated frequency and the measured frequency; and a charge/discharge control unit configured to charge or discharge the storage battery based on the charge or discharge control variable, wherein the base-point determining unit is configured to determine the base-point in such a manner that as the obtained SOC increases, the power to be discharged from the storage battery increases or the power to be charged in the storage battery decreases, and a third rate of change is smaller than a first rate of change and a second rate of change, the first rate of change being an average rate of change in the base-point with respect to the SOC when the SOC is within a first range smaller than a first threshold, the second rate of change being an average rate of change in the base-point with respect to the SOC when the SOC is within a second range larger than a second threshold larger than the first threshold, the third rate of change being an average rate of change in the base-point with respect to the SOC when the SOC is within a third range from the first threshold to the second threshold.

Accordingly, the frequency control apparatus produces the same advantages.

Furthermore, a storage battery system according to an aspect of the present invention includes the frequency regulation apparatus and the storage battery.

Accordingly, the storage battery system produces the same advantages.

These general and specific aspects may be implemented by a system, a method, an integrated circuit, a computer program, or a computer-readable recording medium such as a CD-ROM, or any combination of the system, the method, the integrated circuit, the computer program, and the recording media.

The embodiments will be described with reference to the drawings in detail.

Each of the embodiments described below shows general or specific examples. The numerical values, shapes, materials, constituent elements, the arrangement and connection of the constituent elements, steps, the processing order of the steps etc. shown in the following exemplary embodiments are mere examples, and therefore do not limit the scope of the present invention. Furthermore, the constituent elements that are not described in independent claims that describe the most generic concept of the present invention are described as arbitrary constituent elements.

(Embodiment 1)

Embodiment 1 will describe a frequency regulation apparatus that regulates a frequency of a power system so that the frequency approximates to a rated frequency, using a storage battery system.

FIG. 1 illustrates a configuration of a power network including a frequency regulation apparatus according to Embodiment 1.

As illustrated in FIG. 1, the power network includes a distribution transformer 11, a distribution line 12, loads 13, and storage battery systems 14.

The distribution transformer 11 is a transformer that is connected to a power system provided by a power system operator, and transforms power supplied from the power system into a voltage to be appropriately supplied to the loads 13.

The distribution line 12 is a power line that electrically connects the distribution transformer 11 to the loads 13, and supplies the power from the distribution transformer 11 to the loads 13.

The loads 13 consume power supplied from the power system. The loads 13 are, for example, household electric appliances.

The storage battery systems 14 charge power supplied from the power system, or discharges power into the power system. The storage battery systems 14 regulate a frequency of the power supplied from the power system so that the frequency approximates to a rated frequency by being charged or discharged as described above.

Each of the storage battery systems 14 specifically includes a storage battery 141 and a frequency regulation apparatus 142.

The storage battery 141 charges or discharges power under control by the frequency regulation apparatus 142. The storage battery 141 includes an inverter that performs AC/DC conversion when the storage battery 141 charges power or performs DC/AC conversion when the storage battery 141 discharges power.

The frequency regulation apparatus 142 measures a frequency of power supplied from a power system, and controls charging or discharging of the storage battery 141 based on the measured frequency so that the frequency approximates to a rated frequency.

The power system may include the distribution transformer 11 and the distribution line 12.

Figure 2:
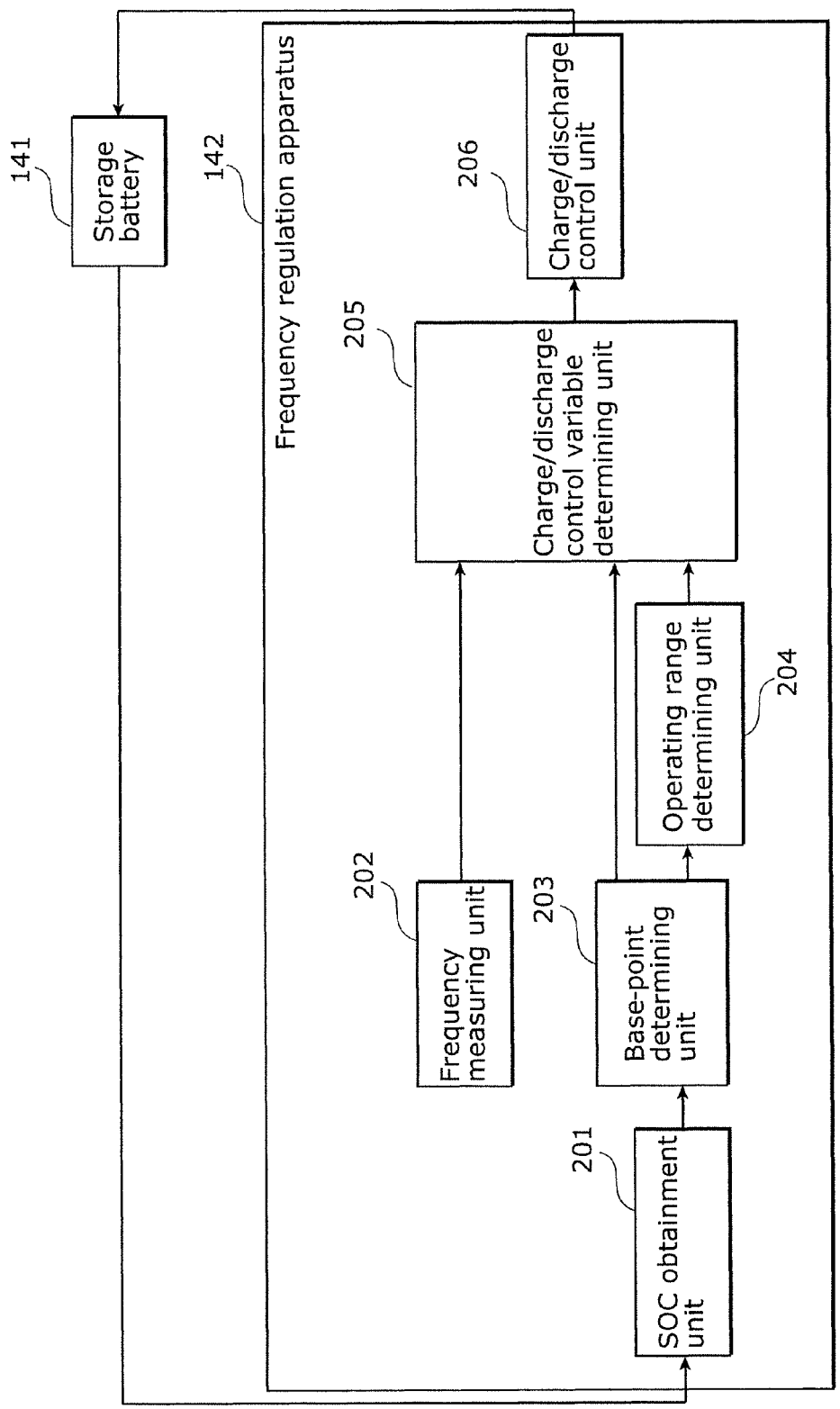
FIG. 2 is a functional block diagram of the frequency regulation apparatus according to Embodiment 1.

FIG. 2 is a functional block diagram of the frequency regulation apparatus 142 according to Embodiment 1.

As illustrated in FIG. 2, the frequency regulation apparatus 142 includes an SOC obtainment unit 201, a frequency measuring unit 202, a base-point determining unit 203, an operating range determining unit 204, a charge/discharge control variable determining unit 205, and a charge/discharge control unit 206.

The SOC obtainment unit 201 obtains an SOC of the storage battery 141. The SOC of the storage battery 141 is an SOC of the power remaining or stored in the storage battery 141. The SOC obtainment unit 201 uses, for example, an amount of charge to the total capacity of the storage battery 141 as the SOC. The SOC obtainment unit 201 corresponds to a charge obtainment unit. The SOC will be described in detail later.

The frequency measuring unit 202 measures a frequency of a power system. The power system supplies AC power at a frequency closer to a standard frequency (for example, 50 Hz or 60 Hz, hereinafter described as 50 Hz). The frequency in supplying power varies according to the power demand supply balance. Specifically, when the demand of power is greater than the supply, the frequency of the power system decreases, for example, to 49.9 Hz or 49.8 Hz. In contrast, when the supply of power is greater than the demand, the frequency of the power system increases, for example, to 50.1 Hz or 50.2 Hz. The frequency of the power system always varies. The frequency measuring unit 202 measures such a varying frequency. When the frequency is continuously regulated, the frequency measuring unit 202 measures the frequency at regular intervals (for example, intervals of 1 second or 4 seconds).

Furthermore, the frequency measuring unit 202 calculates a frequency deviation that is a difference between a rated frequency and the measured frequency of the power system. The rated frequency is determined by calculating either (1) a moving average of frequencies previously measured or (2) a standard frequency of the power system.

According to (1), variations in frequency of the power system for a relatively short period (short period component) can be obtained. Under the frequency regulation using (1) according to Embodiment 1, the variations in frequency of the power system for a relatively short period can be suppressed, resulting in an advantage of smoothing the change in the frequency of the power system.

According to (2), a difference between a frequency of the power system and a standard frequency can be obtained. Under the frequency regulation using (2) according to Embodiment 1, the difference between the frequency of the power system and the standard frequency can be reduced. As a result, the advantage that the frequency of the power system approximates to the rated frequency is produced.

The base-point determining unit 203 determines a base-point indicating a reference value of the power to be charged in or discharged from the storage battery 141. Specifically, the base-point determining unit 203 determines a base-point in such a manner that as the SOC obtained by the SOC obtainment unit 201 increases, the power to be discharged from the storage battery 141 increases or the power to be charged in the storage battery 141 decreases. Here, a third rate of change is smaller than a first rate of change and a second rate of change, the first rate of change being an average rate of change in the base-point with respect to the SOC when the SOC is within a first range smaller than a first threshold, the second rate of change being an average rate of change in the base-point with respect to the SOC when the SOC is within a second range larger than a second threshold larger than the first threshold, the third rate of change being an average rate of change in the base-point with respect to the SOC when the SOC is within a third range from the first threshold to the second threshold. The description "as the SOC obtained by the SOC obtainment unit 201 increases, the power to be discharged from the storage battery 141 increases" above involves the case where when PA denotes an amount of discharge from a storage battery with a SOC A and PB denotes an amount of discharge from the storage battery with a SOC B, PA and PB are equal to each other. Specifically, a relationship between the amounts of discharge PA and PB for the SOCs A and B (A<B) is expressed by PA≤PB. The base-point can be equal to a value indicating power to be charged in or discharged from the storage battery when the frequency is equal to the rated frequency. The method for determining the base-point will be described in detail later.

The operating range determining unit 204 determines an operating range that is the maximum variation range of the amount of charge or discharge of the storage battery 141. The determined operating range will be used later in determining the amount of charge or discharge of the storage battery 141.

Specifically, the operating range is determined by Equation 1 below.

$$(\text{Operating range}) = A - \text{abs}(\text{base-point}) \qquad \text{Equation 1}$$

Here, A can be a constant. Furthermore, A can be an inverter capacity of the storage battery 141. The inverter capacity is a capacity of an inverter that converts DC power output by the storage battery into AC power. In other words, if an inverter is integral with a storage battery, the inverter capacity may indicate the maximum value of AC power that can be discharged from the storage battery.

The charge/discharge control variable determining unit 205 determines a charge or discharge control variable that is a value changed from the base-point by an amount corresponding to a frequency deviation, and that indicates power charged in or discharged from the storage battery 141. The charge/discharge control variable determining unit 205 may determine: the charge or discharge control variable to be closer to a maximum charge value as an absolute value of the frequency deviation increases, when the frequency deviation is larger than 0, the maximum charge value being a value obtained by adding the operating range to the base-point; and the charge or discharge control variable to be closer to a maximum discharge value as the absolute value of the frequency deviation increases, when the frequency deviation is smaller than 0, the maximum discharge value being a value obtained by subtracting the operating range from the base-point. The charge/discharge control variable determining unit 205 corresponds to a control variable determining unit. The method for determining a charge or discharge control variable will be described in detail later.

The charge/discharge control unit 206 charges power in or discharges power from the storage battery 141 according to the charge or discharge control variable determined by the charge/discharge control variable determining unit 205.

FIG. 3A indicates the SOC of the storage battery 141 according to Embodiment 1.

As indicated in (a) of FIG. 3A, the SOC obtainment unit 201 may use a percentage of an SOC within a range (for example, a range from 20% to 80%) out of the total capacity of the storage battery 141, as the SOC for the frequency regulation (also referred to as "SOC for FR" according to Embodiment 1 and as indicated in (b) of FIG. 3A). In other words, the SOC of the storage battery 141 and the SOC for FR may have a linear relationship in which, for example, when the SOC is 20%, the SOC for FR is 0% and when the SOC is 80%, the SOC for FR is 100%.

Specifically, the SOC obtainment unit 201 may determine the SOC for FR according to Equation 2.

$$(\text{SOC for FR}) = 100 \times \{(\text{SOC}) - (\text{backup capacity})\} / (\text{capacity for FR}) \qquad \text{Equation 2}$$

Here, the backup capacity is a lower limit of the capacity for FR out of the SOC of the storage battery 141. Furthermore, the capacity for FR indicates a range to be used for frequency regulation out of the SOC of the storage battery 141.

Using a partial range of the SOC of the storage battery 141 as the SOC for FR brings an advantage of avoiding using up all the power charged in the storage battery 141 for the frequency regulation. Since the power charged in the storage battery 141 is used for operating the load 13, using up all the power for the frequency regulation is undesirable. When the load 13 is operated using the power charged in the storage battery 141, the storage battery 141 and the load 13 may be disconnected from the power system by for example, a switch (not illustrated). The SOC when all the power charged in the storage battery 141 is used up for the frequency regulation is also referred to as backup capacity.

Using a partial range of the SOC of the storage battery 141 as the SOC for FR also brings an advantage of suppressing degradation in the storage battery 141. It is known that use of the storage battery 141 when the SOC is within a range closer to 100% (for example, 80% to 100% or 90% to 100%) or within a range closer to 0% ((for example, 0% to 20% or 0% to 10%) accelerates the degradation. Here, the degradation in the storage battery 141 can be suppressed by avoiding the use in such a range of the SOC that accelerates the degradation. Matching the center of the range of the SOC for FR with the center of the SOC of the storage battery 141 is desirable because the range of the SOC can be used as widely as possible for the SOC for FR while the use of the SOC in the range closer to 100% and in the range closer to 0% can be evenly avoided.

Figure 3B:
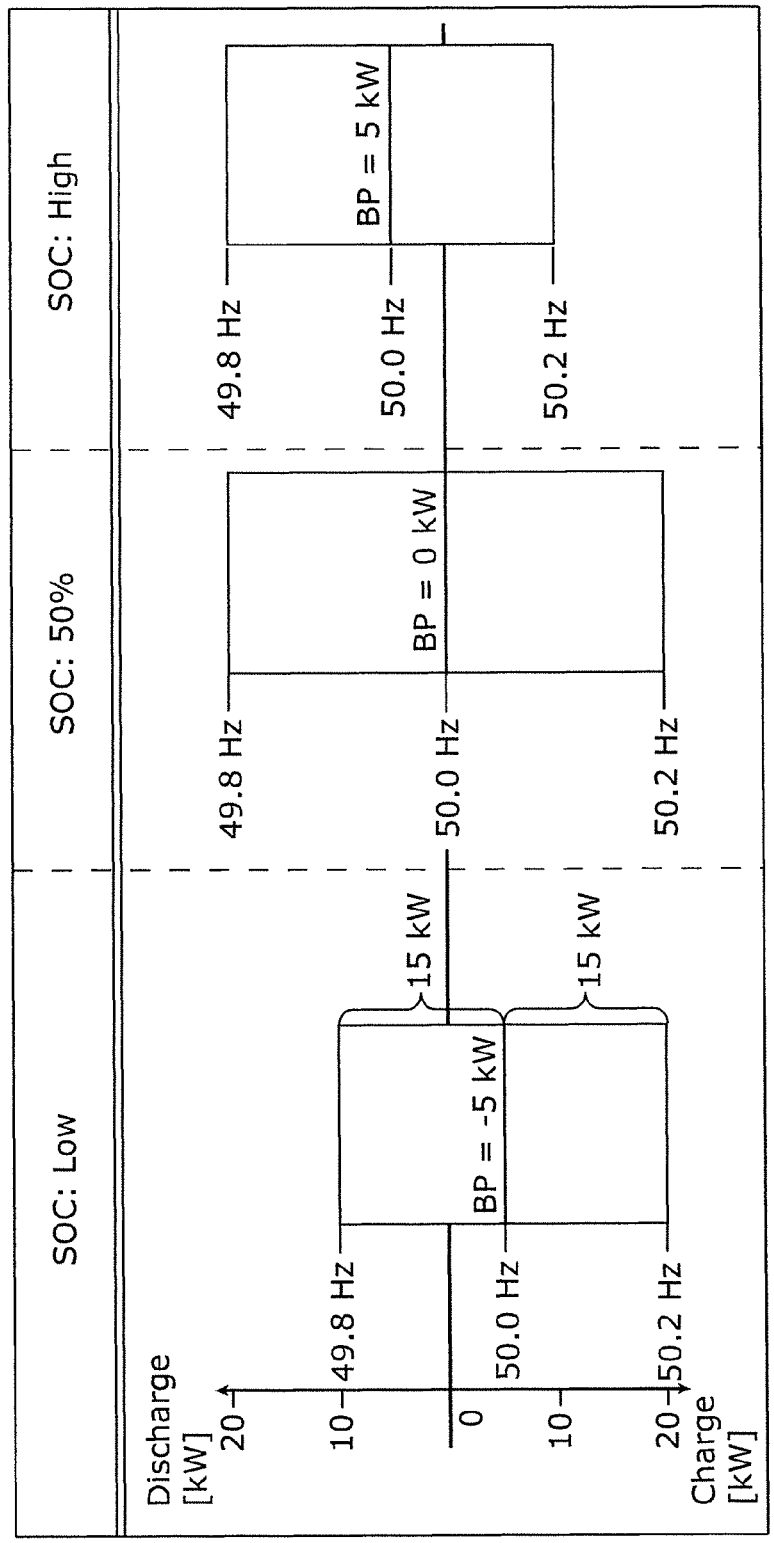
FIG. 3B indicates control over an amount charge or discharge of a storage battery with respect to a base-point according to Embodiment 1.

FIG. 3B indicates control over the amounts of charge and discharge of the storage battery 141, using a base-point according to Embodiment 1. Specifically, FIG. 3B indicates the amounts of power to be charged in or discharged from the storage battery 141 according to the frequency of the power system measured by the frequency measuring unit 202, for each case where the SOC of the storage battery 141 is relatively low, 50%, and relatively high. The plus side of the vertical axis in the graph indicates an amount of discharge from the storage battery 141, whereas the minus side of the vertical axis indicates an amount of charge in the storage battery 141. The amount of discharge smaller than 0 indicates an amount of charge obtained by reversing the sign of the amount of discharge, and the amount of charge smaller than 0 indicates an amount of discharge obtained by reversing the sign of the amount of charge. In FIG. 3B, the base-point is also referred to as "BP".

First, when the SOC of the storage battery 141 is 50%, the base-point determining unit 203 determines the base-point to be 0 kW. Here, when the frequency measured by the frequency measuring unit 202 is 50 Hz, the charge/discharge control variable determining unit 205 determines the charge or discharge control variable to be 0 kW. Furthermore, when the frequency measured by the frequency measuring unit 202 is 49.8 Hz and 50.2 Hz, the charge/discharge control variable determining unit 205 determines the charge and discharge control variables to be 20 kW of discharge and 20 kW of charge, respectively.

Next, when the SOC of the storage battery 141 is relatively low, the base-point determining unit 203 determines the base-point to be a value smaller than 0 kW (for example, −5 kW). Here, when the frequency measured by the frequency measuring unit 202 is 50 Hz, the charge/discharge control variable determining unit 205 determines the charge control variable to be 5 kW. Furthermore, when the frequencies measured by the frequency measuring unit 202 are 49.8 Hz and 50.2 Hz, the charge/discharge control variable determining unit 205 determines the charge and discharge control variables to be 10 kW of discharge and 20 kW of charge, respectively.

Next, when the SOC of the storage battery 141 is relatively high, the base-point determining unit 203 determines the base-point to be a value larger than 0 kW (for example, 5 kW). Here, when the frequency measured by the frequency measuring unit 202 is 50 Hz, the charge/discharge control variable determining unit 205 determines the discharge control variable to be 5 kW. Furthermore, when the frequencies measured by the frequency measuring unit 202 are 49.8 Hz and 50.2 Hz, the charge/discharge control variable determining unit 205 determines the charge and discharge control variables to be 20 kW of discharge and 10 kW of charge, respectively.

As described above, the base-point determining unit 203 can determine an amount of charge or discharge of the storage battery 141 according to the SOC and the frequency of the power system while avoiding the SOC of the storage battery 141 becoming zero.

The base-point determining unit 203 can also determine a base-point according to the SOC. Such a method for determining a base-point and the problems associated with the method for controlling an amount of charge or discharge using the base-point will be described with reference to FIG. 4.

Figure 4:
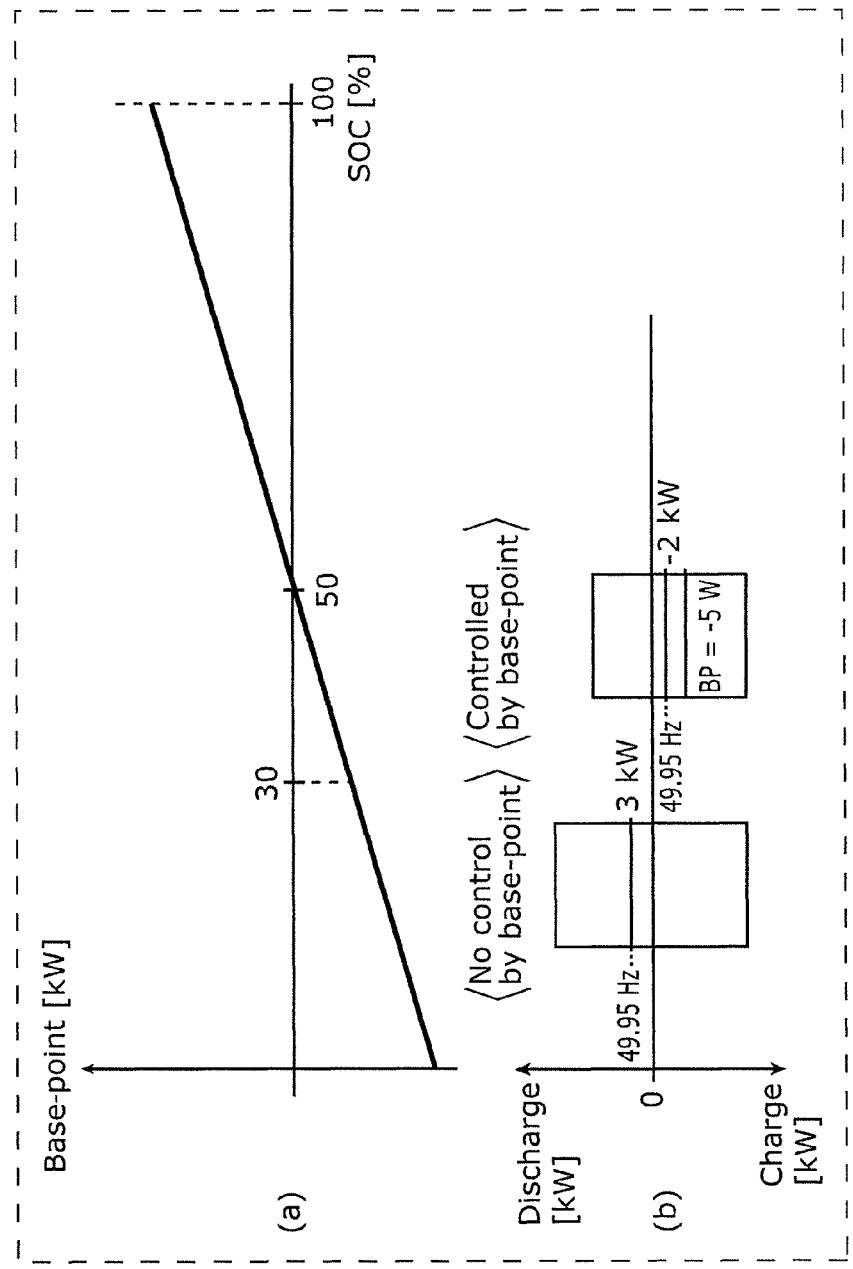
FIG. 4 indicates a method for determining a base-point according to a related art.

FIG. 4 indicates a method for determining a base-point according to a related art of Embodiment 1. In (a) of FIG. 4, the SOC is indicated along the horizontal axis, and the base-point corresponding to each value of the SOCs is indicated along the vertical axis. Furthermore, the graph indicates that the base-point is linearly changed with respect to the SOC.

When the base-point has such a value, the storage battery sometimes charges or discharges power against the frequency regulation over the power system, depending on the SOC of the storage battery. Specifically, assume a case where the SOC is reduced to 30% and the frequency of the power system is changed to 49.95 Hz. Without any control by the base-point, the charge or discharge control variable for regulating the frequency of the power system is 3 kW of discharge (left bar in (b) of FIG. 4). However, under control by the base-point, the charge or discharge control variable becomes 2 kW of charge (right bar in (b) of FIG. 4). Specifically, the storage battery 141 charges or discharges power against the frequency regulation. More specifically, the frequency of the power system is never regulated to approximate to the rated frequency.

Here, the techniques according to Embodiment 1 can suppress charging or discharging against the frequency regulation by the storage battery 141. The charging or discharging against the frequency regulation by the storage battery 141 may be referred to as "a reverse operation".

Figure 5A:
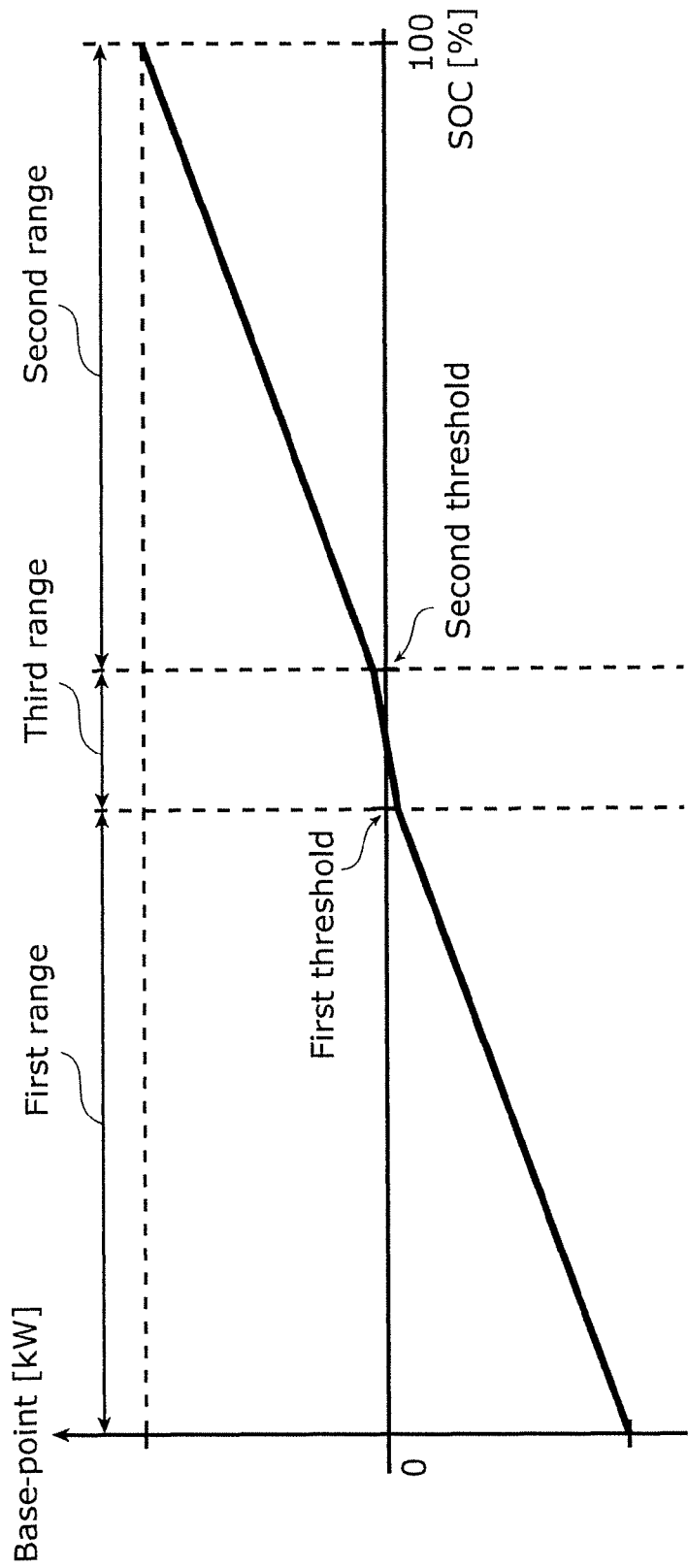
FIG. 5A indicates a first method for determining a base-point according to Embodiment 1.
Figure 5B:
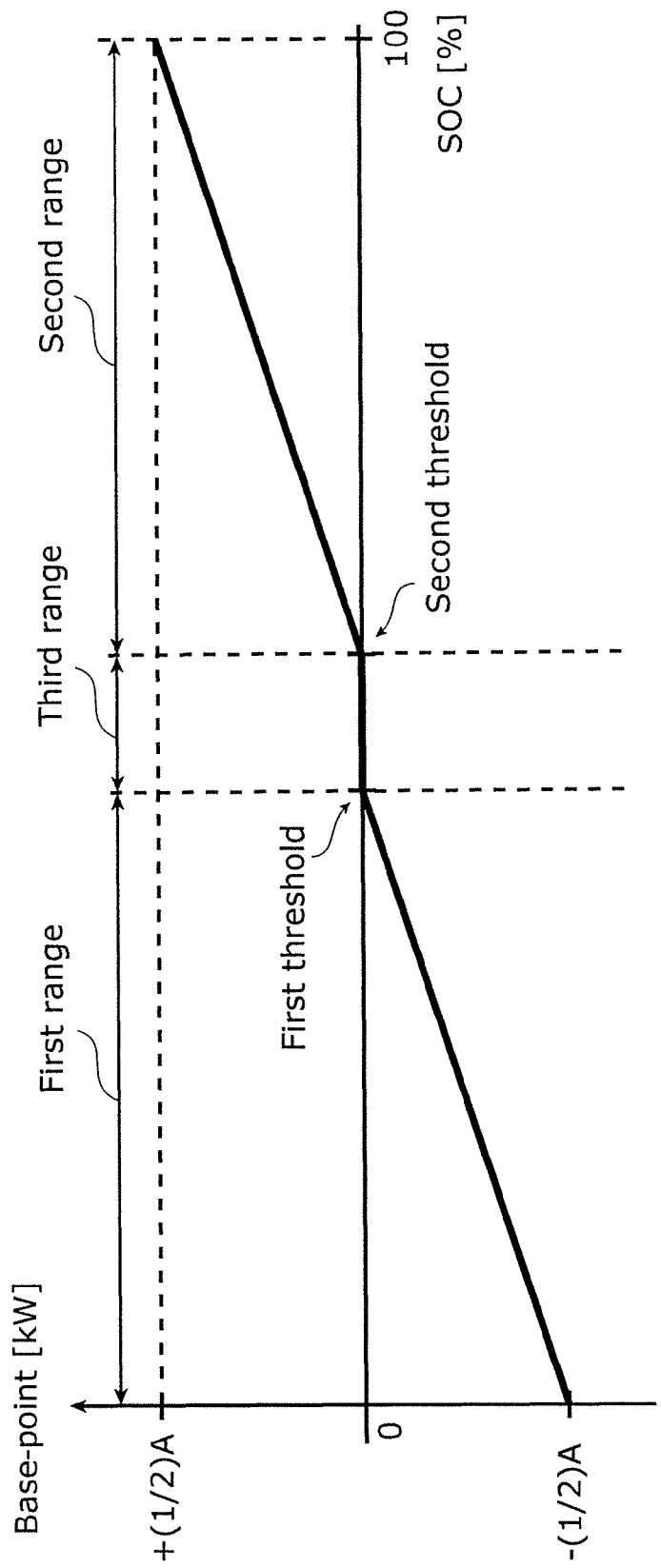
FIG. 5B indicates a second method for determining a base-point according to Embodiment 1.
Figure 5C:
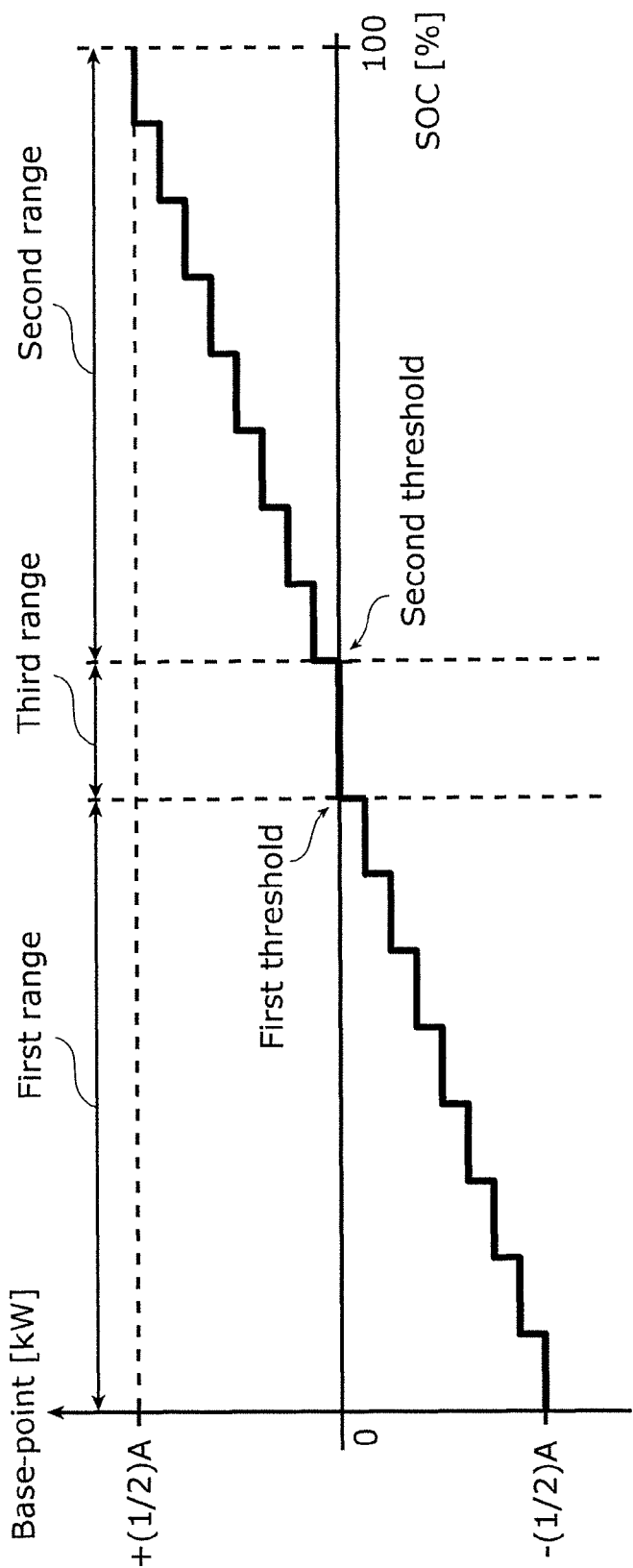
FIG. 5C indicates a third method for determining a base-point according to Embodiment 1.

FIGS. 5A to 5C indicate methods for determining a base-point according to Embodiment 1.

FIG. 5A indicates a first method for determining a base-point according to Embodiment 1.

In FIG. 5A, each SOC of the storage battery 141 is indicated along the horizontal axis, and the base-point corresponding to each value of the SOCs is indicated along the vertical axis.

As indicated in FIG. 5A, the SOCs are divided into a first range that is a range smaller than a first threshold, a second range larger than a second threshold larger than the first threshold, and a third range from the first threshold to the second threshold. The rates of change (slopes in the graph) in the base-points with respect to the SOCs in the first, second, and third ranges are first, second, and third rates of change, respectively.

Here, the third rate of change is smaller than the first and second rates of change. Defining the third rate of change in such a manner can reduce the amount of change in the base-point with respect to the amount of change in the SOC that is relatively closer to 50% more than those of the other SOCs. Accordingly, the range of the frequency and the range of the SOC within which the reverse operation may occur under the control by the base-point can be reduced, and consequently, the occurrence of the reverse operation can be suppressed.

FIG. 5B indicates a second method for determining a base-point according to Embodiment 1. In FIG. 5B, each SOC of the storage battery 141 is indicated along the horizontal axis, and the base-point corresponding to each value of the SOCs is indicated along the vertical axis.

As indicated in FIG. 5B, the base-point in the third range is 0. Defining the third rate of change in such a manner can eliminate the amount of change in the base-point with respect to the amount of change in the SOC that is relatively closer to 50%. Furthermore, appropriately setting the first and second thresholds can eliminate the reverse operation.

Equations 3, 4, and 5 below may be used for the first range, the second range, and the third range, respectively so that the base-point determining unit 203 determines a base-point as indicated in FIG. 5B.

(Base point)=$A$×{(SOC)−(first threshold)}/[100−(second threshold)−(first threshold)}] (Equation 3)

(Base point)=$A$×{(SOC)−(second threshold)}/[100−(second threshold)−(first threshold)}] (Equation 4)

(Base point)=0 (Equation 5)

Here, A may be any constant. Furthermore, A may be an inverter capacity of the storage battery 141.

FIG. 5C indicates the third method for determining a base-point according to Embodiment 1. In FIG. 5C, each SOC of the storage battery 141 is indicated along the horizontal axis, and the base-point corresponding to each value of the SOCs is indicated along the vertical axis.

FIG. 5C features that the base-point in the third range is zero as indicated in FIG. 5B. Furthermore, the base-point changes in stages according to the change in the SOC, in each of the first and second ranges. This setting produces the same advantages as in FIG. 5B.

Figure 6:
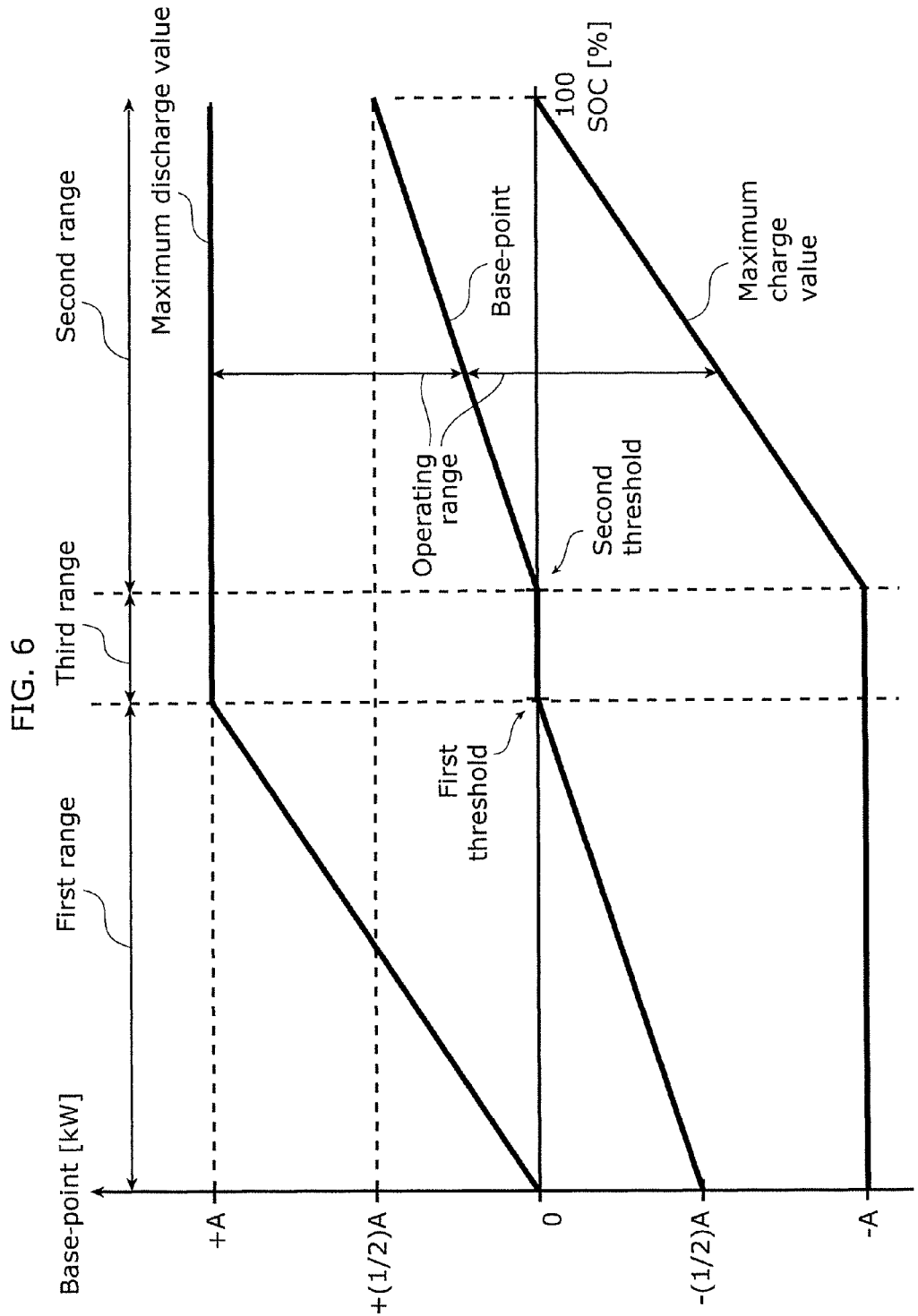
FIG. 6 indicates a method for determining a charge or discharge control variable according to Embodiment 1.

FIG. 6 indicates a method for determining a charge or discharge control variable according to Embodiment 1.

In FIG. 6, each SOC of the storage battery 141 is indicated along the horizontal axis, and a maximum discharge value and a maximum charge value corresponding to each value of the SOCs is indicated along the vertical axis. The maximum discharge value is the maximum power to be discharged from the storage battery 141 for frequency regulation, and is obtained as a value larger than the base-point by a value corresponding to an operating range. Furthermore, the maximum charge value is the maximum power to be charged in the storage battery 141 for frequency regulation, and is obtained as a value smaller than the base-point by an operating range.

The charge/discharge control variable determining unit 205 determines the amount of power to be charged in or discharged from the storage battery 141 as a charge or discharge amount control variable. The charge/discharge control variable determining unit 205 determines the charge or discharge control variable according to the SOC of the storage battery 141 and the frequency of the power system measured by the frequency measuring unit 202. Specifically, the charge/discharge control variable determining unit 205 obtains the maximum charge value and the maximum discharge value corresponding to the SOC of the storage battery 141 from FIG. 6, and determines a value between the obtained maximum charge value and maximum discharge value based on the frequency of the power system, to be a charge or discharge control variable.

More specifically, the charge/discharge control variable determining unit 205 determines the charge or discharge control variable according to Equation 6 below.

(Charge or discharge control variable)=(base-point)−(operating range)×(frequency deviation)/(normal frequency range) (Equation 6)

Here, the frequency deviation is a difference between the frequency measured by the frequency measuring unit 202 and a rated frequency. For example, when the frequency measured by the frequency measuring unit 202 is 50.2 Hz and the rated frequency is 50 Hz, the frequency deviation is 0.2 Hz. Furthermore, the normal frequency range indicates a range determined as normal when the frequency of the power system increases or decreases with respect to the rated frequency. For example, when the rated frequency is 50 Hz and the frequencies between 49.8 Hz and 50.2 Hz are determined as normal, the normal frequency range is 0.2.

Figure 7:
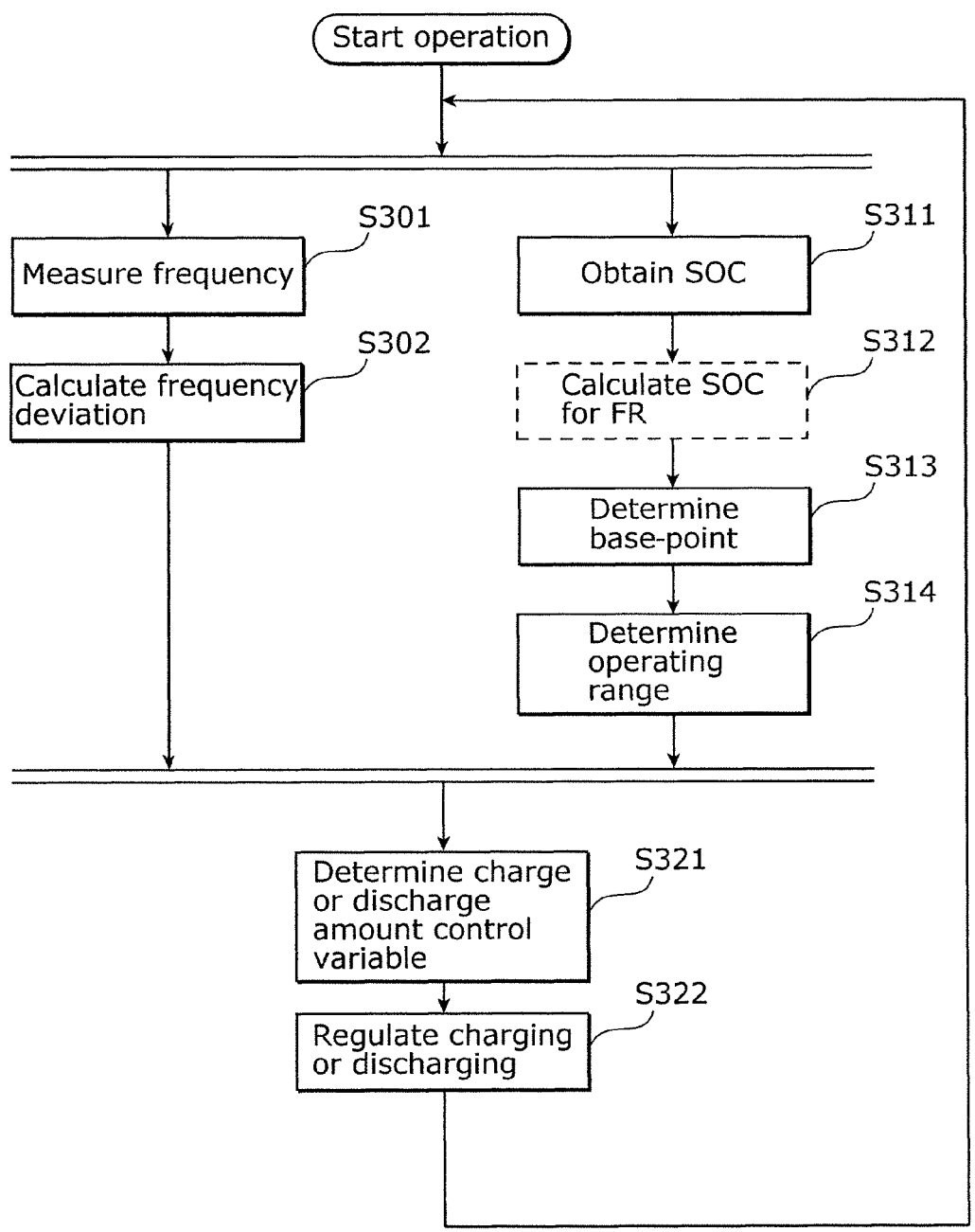
FIG. 7 is a flowchart of a frequency regulation method according to Embodiment 1.

FIG. 7 is a flowchart of the frequency regulation method according to Embodiment 1.

At Step S301, the frequency measuring unit 202 measures a frequency of a power system.

At Step S302, the frequency measuring unit 202 calculates a frequency deviation from the frequency of the power system obtained at Step S301. There are two calculation methods (1) and (2) above for a frequency deviation.

At Step S311, the SOC obtainment unit 201 obtains an SOC of the storage battery 141.

At Step S312, the SOC obtainment unit 201 calculates an SOC for frequency regulation (SOC for FR), based on the SOC obtained at Step S311. The SOC obtainment unit 201 may use the SOC obtained at Step S311 as it is for the SOC for FR. In such a case, Step S312 does not have to be performed. In other words, Step S312 is not essential.

At Step S313, the base-point determining unit 203 determines a base-point that is a value indicating a reference value of the power to be charged in or discharged from the storage battery 141.

At Step S314, the operating range determining unit 204 determines an operating range that is the maximum variation range of the amount of charge or discharge of the storage battery 141.

At Step S321, the charge/discharge control variable determining unit 205 determines the amount of power to be charged in or discharged from the storage battery 141 as a charge or discharge amount control variable.

At Step S322, the charge/discharge control unit 206 charges power in or discharges power from the storage battery 141 according to the charge or discharge control variable determined by the charge/discharge control variable determining unit 205.

In the processes, Steps S321 and S322 may be performed after completion of both the processes at Steps S301 and S302 and the processes at Steps S311 to S314 (as indicated in FIG. 7). Alternatively, Steps S321 and S322 may be performed after completion of one of (i) the processes at Steps S301 and S302 and (ii) the processes at Steps S311 to S314.

In the latter case, values to be determined at the other one of (i) and (ii) may be the latest values at the time of processing, among the values previously calculated, that is, the values determined previously at each of Steps.

An example of the processing intervals and others in the latter case will be described hereinafter. The processes at Steps S301 and S302 are performed each time the frequency measuring unit 202 measures a frequency of a power system. The processing interval is, for example, 1 second. Furthermore, the processes at Steps S311 to S314 are performed each time the SOC obtainment unit 201 obtains an SOC of the storage battery 141. The processing interval is, for example, 1 minute. Here, each time the processes at Steps S301 and S302 are completed for 1 second, the processes of Steps S321 and S322 may be performed.

Figure 8:
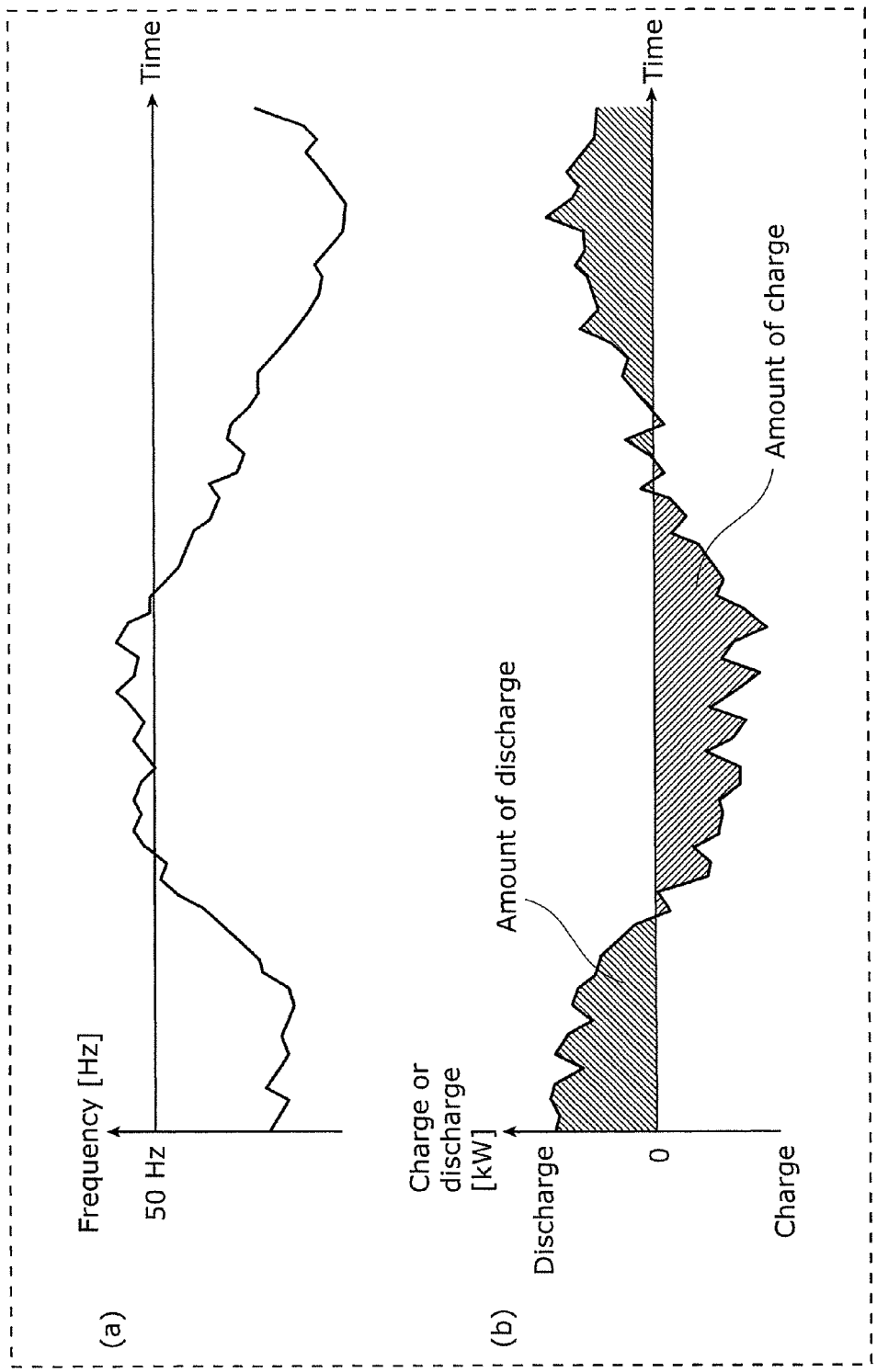
FIG. 8 indicates a first example of frequencies and amounts of charge and discharge that are regulated by the frequency regulation method according to Embodiment 1.

FIG. 8 indicates a first example of frequencies and amounts of charge and discharge determined by the frequency regulation method according to Embodiment 1.

(a) of FIG. 8 indicates a temporal change in the frequency of a power system. Here, the standard frequency is 50 Hz. (b) of FIG. 8 indicates a temporal change in the amounts of charge and discharge when the frequencies in (a) of FIG. 8 are regulated according to Embodiment 1. Furthermore, (b) of FIG. 8 indicates a case where the frequency measuring unit 202 calculates a frequency deviation according to the calculation method (1).

When the frequency measuring unit 202 calculates a frequency deviation according to the calculation method (1) as indicated in (b) of FIG. 8, the frequency is regulated so that the amounts of charge and discharge are balanced over a long period of time. In other words, the graphic area indicating the amount of discharge substantially becomes equal to the graphic area indicating the amount of charge in the graph.

As described above, the amounts charged in and discharged from the storage battery 141 can be balanced over a long period of time under the frequency regulation using the frequency deviation calculated by the frequency measuring unit 202 according to the calculation method (1).

Although only the fluctuations in the frequency of the power system over a relatively short period of time are suppressed, the advantage that the frequency of the power system approximates to the standard frequency is not always produced. In such a case, a power generator (for example, thermal power plant that is not illustrated) is connected to the distribution line 12, so that the frequency of the power system can approximate to the standard frequency. Here, the storage battery is more quickly charged or discharged than the power generator. Thus, regulating the frequency of the power system using both the storage battery and the power generator by (i) suppressing the fluctuations for a relatively shorter period of time through charging or discharging the storage battery and (ii) reducing the difference between the frequency of the power system and the standard frequency using the thermal power plant will lead to a significant advantage.

Figure 9:
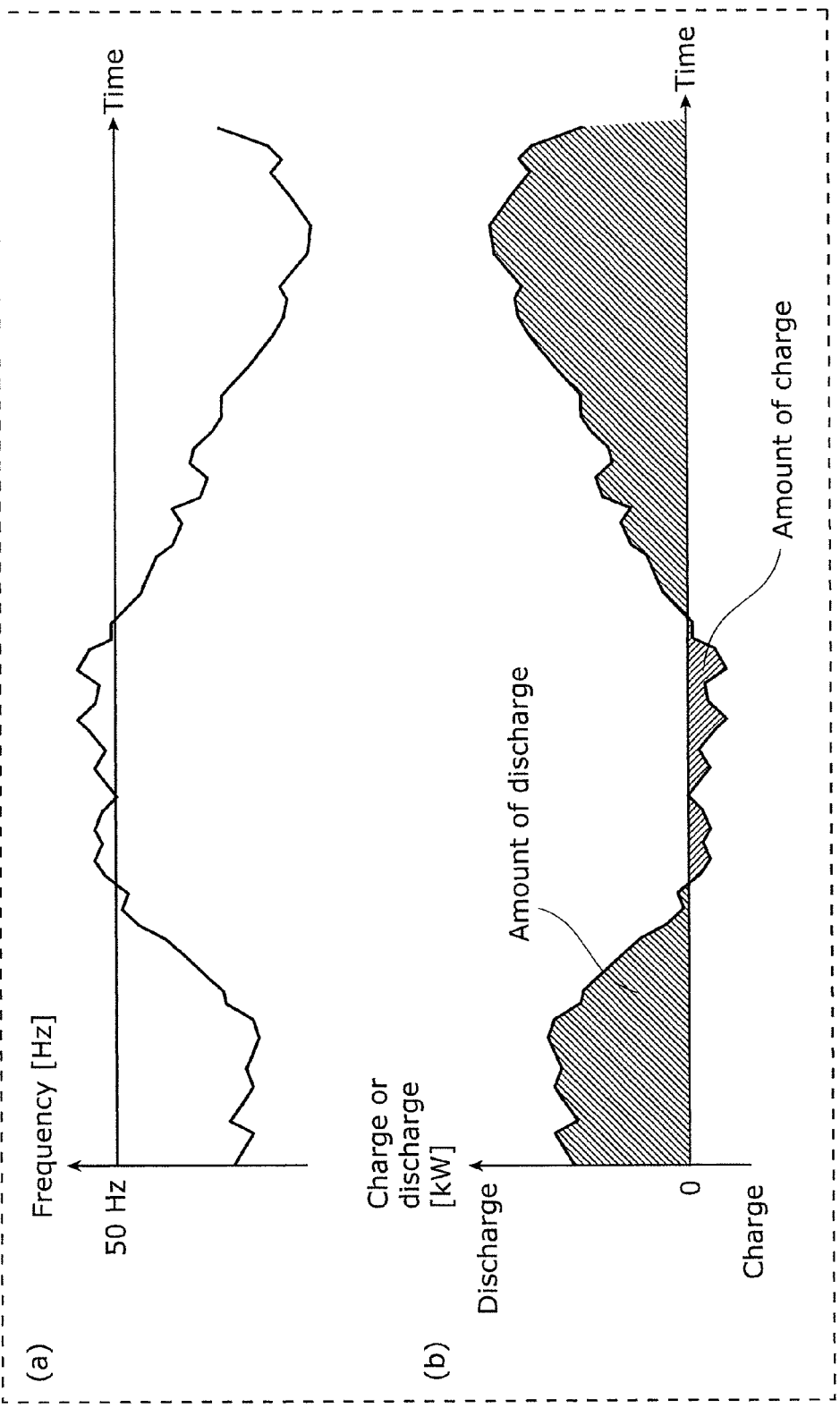
FIG. 9 indicates a second example of frequencies and amounts of charge and discharge that are regulated by the frequency regulation method according to Embodiment 1.

FIG. 9 indicates a second example of frequencies and amounts of charge and discharge determined by the frequency regulation method according to Embodiment 1.

(a) of FIG. 9 indicates a temporal change in the frequency of a power system. Here, the standard frequency is 50 Hz. (b) of FIG. 9 indicates a temporal change in the amounts of charge and discharge when the frequencies in (a) of FIG. 9 are regulated according to Embodiment 1. Furthermore, (b) of FIG. 9 indicates a case where the frequency measuring unit 202 calculates a frequency deviation according to the calculation method (2).

When the frequency measuring unit 202 calculates a frequency deviation according to the calculation method (2) as indicated in (b) of FIG. 9, the charging or discharging the storage battery 141 is regulated so as to offset a difference between the frequency of the power system and the rated frequency. In other words, the amounts of charge and discharge vary in the same manner as flipping the temporal change in the frequency of the power system ((a) of FIG. 9) horizontally.

As described above, the frequency of the power system can be approximated to the standard frequency under the frequency regulation using the frequency deviation calculated by the frequency measuring unit 202 according to the calculation method (2).

Furthermore, when the SOC is within the third range, the variation range of the base-point with respect to the change in the SOC can be suppressed smaller than that when the SOC is within the second or the third range according to the frequency regulation method of Embodiment 1. Thus, the frequency regulation apparatus can regulate the frequency of the power system over a long period of time.

In the conventional related art, the variation ranges of the base-point with respect to the change in the SOC are the same in the first to the third ranges. Even when the SOC is approximately closer to a certain value (in the third range), the base-point varies according to the change in the SOC. The amount to be charged in or discharged from the power system for frequency regulation is corrected to appropriately maintain the SOC of the storage battery. This correction sometimes causes switching between the charging and the discharging of the power system. In such a case, the frequency is not appropriately regulated.

With the frequency regulation method according to an aspect of the present invention, the variation range when the SOC is within the third range becomes smaller, and the switching between the charging and the discharging is suppressed. As a result, the frequency regulation apparatus can regulate the frequency of the power system using the storage battery while appropriately maintaining the SOC of the storage battery.

Furthermore, the frequency regulation apparatus can determine, to be an amount of charge or discharge of the storage battery, a value that is changed by the amount corresponding to the frequency deviation from a reference that is a value indicating power to be charged in or discharged from the storage battery, when the frequency of the power system is equal to the rated frequency.

Furthermore, resetting the base-point when the SOC is within the third range to 0 that is a fixed value can further suppress switching between the charging and the discharging.

Furthermore, when a range of the SOC including 50% is defined as the third range, the frequency can be regulated so that the SOC of the storage battery can be maintained within the third range.

Furthermore, the frequency regulation apparatus can suppress the fluctuations in frequency for a relatively short period of time.

Furthermore, the frequency regulation apparatus can reduce the difference between the frequency of a power system and the standard frequency.

Furthermore, the frequency regulation apparatus can determine an amount to be charged in or discharged from the storage battery according to the frequency deviation, within the operating range.

Furthermore, the frequency regulation apparatus can determine a base-point and a charge or discharge control variable each time the frequency of the power system is measured, and continuously regulate the frequency.

Furthermore, the frequency regulation apparatus can newly determine a base-point only when the SOC of the storage battery varies to a relatively larger extent. When the change in the SOC of the storage battery is smaller, the frequency regulation apparatus does not newly determine a base-point. Thus, the processing load of the frequency regulation apparatus is reduced.

Furthermore, the frequency regulation apparatus can charge or discharge a storage battery by avoiding the use in the range of the SOC that accelerates the degradation in the storage battery. Thus, the degradation can be suppressed.

(Embodiment 2)

Embodiment 2 will describe a frequency regulation apparatus that regulates a frequency of a power system so that the frequency approximates to a rated frequency, using a storage battery system via a network. Some detailed description of the constituent elements described in Embodiment 1 will be hereinafter omitted by using the same reference numerals.

Figure 10:
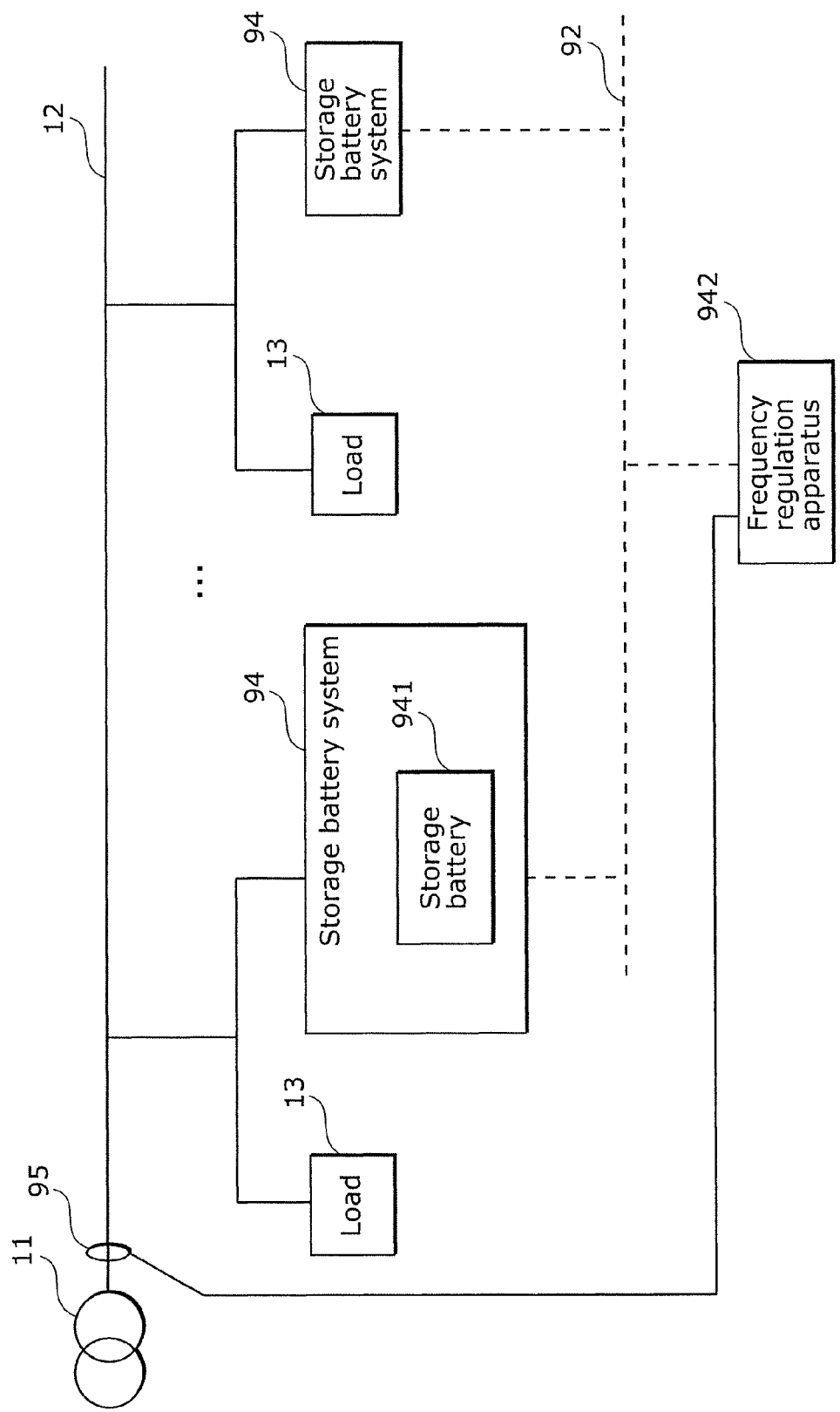
FIG. 10 illustrates a configuration of a power network including a frequency regulation apparatus according to Embodiment 2.

FIG. 10 illustrates a configuration of a power network including a frequency regulation apparatus 942 according to Embodiment 2.

As illustrated in FIG. 10, the power network includes the distribution transformer 11, the distribution line 12, the loads 13, a communication network 92, storage battery systems 94, the frequency regulation apparatus 942, and a power sensor 95.

The communication network 92 is connected between the frequency regulation apparatus 942 and the storage battery systems 94 for establishing their communication. The communication network 92 is, for example, a wired LAN that conforms to IEEE802.3, a wireless LAN that conforms to IEEE802.11a/b/g, and a switched line such as a mobile phone line.

The power sensor 95 is a power sensor that measures a frequency of power of a power system.

Each of the storage battery systems 94 includes a storage battery 941 and a communication unit (not illustrated). The storage battery 941 charges or discharges power under the regulation of the frequency regulation apparatus 942 via the communication network 92. Furthermore, the communication unit is a communication interface that communicates with the frequency regulation apparatus 942 via the communication network 92. The storage battery systems 94 are different from the storage battery system 14 in regulation via the communication network 92. The storage battery systems 94 are the same as the storage battery system 14 in the other features.

The power sensor 95 measures the frequency of the power supplied from the power system, and the frequency regulation apparatus 942 regulates charging or discharging the storage batteries 941 so that a frequency of the power of the power system approximates to a rated frequency via the communication network 92, based on the measured frequency. Furthermore, the frequency regulation apparatus 942 includes a communication unit (not illustrated) that is a communication interface that communicates with the frequency regulation apparatus 142 via the communication network 92. The frequency regulation apparatus 942 is different from the frequency regulation apparatus 142 in regulating the storage battery systems 94 via the communication network 92. Furthermore, the frequency regulation apparatus 942 regulates one or more storage battery systems. The frequency regulation apparatus 942 is the same as the storage battery systems 94 except for the feature.

Specifically, the frequency regulation apparatus 942 transmits a charge or discharge control variable to each of the storage battery systems to control charging or discharging thereof. The charge or discharge control variable to be transmitted to each of the storage battery systems is equivalent to the amount of charge or discharge distributed to the storage battery systems as a whole.

For example, each of the storage battery systems 94 transmits the inverter capacity of the storage battery system 94 to the frequency regulation apparatus 942 via the communication network 92. The frequency regulation apparatus 942 receives the inverter capacity transmitted from the storage battery system 94. Then, the frequency regulation apparatus 942 determines the amount to be charged in or discharged from each of the storage battery systems 94 in proportion to the received inverter capacity, and transmits the determined amount as a charge or discharge control variable to each of the storage battery systems 94.

Specifically, when there are N storage battery systems (storage battery systems A (inverter capacity IA), B (IB), . . . ), the charge or discharge control variable to be transmitted to a storage battery system X is calculated according to Equation 7.

(Charge or discharge control variable to be transmitted to $X$)=(total amount to be charged in or discharged from $X$)×$IX/(\Sigma I)$    (Equation 7)

Here, ($\Sigma I$) denotes a sum of inverter capacities of the N storage battery systems.

The charging or discharging of each of the storage battery systems can be regulated according to the amount of charge or discharge corresponding to the inverter capacity of the storage battery system.

With the frequency regulation method of Embodiment 2, the frequency regulation apparatus can regulate the storage battery systems via a network.

Each of the constituent elements may be implemented by dedicated hardware or by executing a software program appropriate for the constituent element. Each of the constituent elements may be implemented by program executing units, such as a central processing unit (CPU) and a processor, through reading and executing a software program recorded on recording media, such as a hard disk or a semiconductor memory. Here, the software that implements the frequency regulation apparatus according to each of Embodiments 1 and 2 is the following program.

Specifically, the program causes a computer to execute a frequency regulation method for regulating a frequency of a power system so that the frequency approximates to a rated frequency, the method including: measuring the frequency; obtaining an SOC of a storage battery; determining a base-point indicating a reference value of power to be charged in or discharged from the storage battery; determining a charge or discharge control variable that is a value changed from the base-point by an amount corresponding to a frequency deviation that is a difference between the rated frequency and the measured frequency; and charging or discharging the storage battery based on the charge or discharge control variable, wherein in the determining of a base-point: the base-point is determined in such a manner that as the obtained SOC increases, the power to be discharged from the storage battery increases or the power to be charged in the storage battery decreases; and a third rate of change is smaller than a first rate of change and a second rate of change, the first rate of change being an average rate of change in the base-point with respect to the SOC when the SOC is within a first range smaller than a first threshold, the second rate of change being an average rate of change in the base-point with respect to the SOC when the SOC is within a second range larger than a second threshold larger than the first threshold, the third rate of change being an average rate of change in the base-point with respect to the SOC when the SOC is within a third range from the first threshold to the second threshold.

The frequency regulation apparatus according to one or more aspects of the present invention is described based on Embodiments, but the present invention is not limited to such Embodiments. Without departing from the scope of the present invention, the aspects may include an embodiment with some modifications on Embodiments conceived by a person skilled in the art, and another embodiment obtained through combinations of the constituent elements of different Embodiments in the present invention.

INDUSTRIAL APPLICABILITY

The present invention is applicable to frequency regulation apparatuses that regulate the frequency of a power system so that the frequency approximates to a rated frequency. Specifically, the present invention is applicable to frequency regulation apparatuses that regulate the frequencies of power systems operated and managed by electric power companies.

REFERENCE SIGNS LIST

11 Distribution transformer
12 Distribution line
13 Load
14, 94 Storage battery system
92 Communication network
95 Power sensor
141, 941 Storage battery
142, 942 Frequency regulation apparatus
201 SOC obtainment unit
202 Frequency measuring unit
203 Base point determining unit
204 Operating range determining unit
205 Charge/discharge control variable determining unit
206 Charge/discharge control unit

The invention claimed is:

1. A frequency regulation method for regulating a frequency of a power system by charging or discharging a storage battery, the method comprising:
   measuring the frequency;
   obtaining an SOC (state of charge) of the storage battery;
   determining a base-point indicating a value of power to be charged in or discharged from the storage battery when the measured frequency is equal to a predetermined rated frequency;
   determining a charge control variable or a discharge control variable that is a power value changed from the base-point by an amount corresponding to a frequency deviation that is a difference between the predetermined rated frequency and the measured frequency to generate the charge control variable or the discharge control variable; and
   charging or discharging the storage battery based on the charge control variable or the discharge control variable,
   wherein in the determining a base-point:
   the base-point is determined to be equal to a charging power value when the SOC of the storage battery is within a first range smaller than a first threshold, the charging power value indicating power that is being charged in the storage battery;
   the base-point is determined to be equal to a discharging power value when the SOC of the storage battery is within a second range larger than a second threshold larger than the first threshold, the discharging power value indicating power that is being discharged from the storage battery;
   the base-point is changed according to the SOC of the storage battery; and
   a third rate of change is smaller than a first rate of change and a second rate of change, the first rate of change being an average rate of change in the base-point with respect to the SOC when the SOC is within the first range, the second rate of change being an average rate of change in the base-point with respect to the SOC when the SOC is within the second range, the third rate of change being an average rate of change in the base-point with respect to the SOC when the SOC is within a third range from the first threshold to the second threshold.

2. The frequency regulation method according to claim 1, wherein in the determining a base-point, the base-point is determined to be 0 when the obtained SOC is within the third range.

3. The frequency regulation method according to claim 1, wherein the first threshold ranges from 0 to 50% of a full capacity of the storage battery, and
   the second threshold ranges from 50% to 100% of the full capacity of the storage battery.

4. The frequency regulation method according to claim 1, wherein the predetermined rated frequency is a moving average of a plurality of frequencies measured in a previous predetermined period.

5. The frequency regulation method according to claim 4, further comprising
   determining an operating range indicating a maximum range within which an amount of charge or discharge is increased with respect to the base-point,
   wherein in the determining a charge control variable or a discharge control variable, the charge control variable or the discharge control variable is determined to be closer to a maximum charge value as an absolute value of the frequency deviation increases, when the frequency deviation is larger than 0, the maximum charge value being a value obtained by adding the operating range to the base-point, and the charge control variable or the discharge control variable is determined to be closer to a maximum discharge value as the absolute value of the frequency deviation increases, when the frequency deviation is smaller than 0, the maximum discharge value being a value obtained by subtracting the operating range from the base-point.

6. The frequency regulation method according to claim 1, wherein the predetermined rated frequency is a standard frequency defined for the power system.

7. The frequency regulation method according to claim 1, wherein in the determining a base-point, a base-point is newly determined each time when the charge control variable or the discharge control variable is generated.

8. The frequency regulation method according to claim 1, wherein in the obtaining an SOC, SOCs are obtained at predetermined times, and in the determining a base-point, a base-point is newly determined when the SOC obtained in the obtaining an SOC is different from each of the SOCs obtained at the predetermined times by a predetermined value or more.

9. The frequency regulation method according to claim 1, wherein in the obtaining an SOC, a percentage of the SOC within a range out of a total capacity of the storage battery is obtained as the SOC.

10. A frequency regulation apparatus that regulates a frequency of a power system by charging or discharging a storage battery, the apparatus comprising:
a frequency measuring unit configured to measure the frequency;
a charge obtainment unit configured to obtain an SOC (state of charge) of the storage battery;
a base-point determining unit configured to determine a base-point indicating a value of power to be charged in or discharged from the storage battery when the measured frequency is equal to a predetermined rated frequency;
a control variable determining unit configured to generate a charge control variable or a discharge control variable that is a power value changed from the base-point by an amount corresponding to a frequency deviation that is a difference between the predetermined rated frequency and the measured frequency; and
a charge/discharge control unit configured to charge or discharge the storage battery based on the charge control variable or the discharge control variable,
wherein the base-point determining unit is configured to:
determine the base-point to be equal to a charging power value when the SOC of the storage battery is within a first range smaller than a first threshold, the charging power value indicating power that is being charged in the storage battery;
determine the base-point to be equal to a discharging power value when the SOC of the storage battery is within a second range larger than a second threshold larger than the first threshold, the discharging power value indicating power that is being discharged from the storage battery; and
change the base-point according to the SOC of the storage battery, and
a third rate of change is smaller than a first rate of change and a second rate of change, the first rate of change being an average rate of change in the base-point with respect to the SOC when the SOC is within the first range, the second rate of change being an average rate of change in the base-point with respect to the SOC when the SOC is within the second range, the third rate of change being an average rate of change in the base-point with respect to the SOC when the SOC is within a third range from the first threshold to the second threshold.

11. A storage battery system comprising:
the frequency regulation apparatus according to claim 10; and
the storage battery.

* * * * *